United States Patent [19]

Schlienger

[11] 3,721,511

[45] March 20, 1973

[54] ROTATING ARC FURNACE CRUCIBLE

[76] Inventor: Max P. Schlienger, 136 Mitchell Boulevard, San Rafael, Calif. 94903

[22] Filed: Feb. 18, 1971

[21] Appl. No.: 116,429

[52] U.S. Cl. ..........................425/8, 264/8, 264/10, 13/10
[51] Int. Cl. ..............................................B29c 23/00
[58] Field of Search .........425/6, 8; 264/8, 10; 13/10

[56] References Cited

UNITED STATES PATENTS

| | | | |
|---|---|---|---|
| 2,897,539 | 8/1959 | McMillan | 425/8 X |
| 1,601,897 | 10/1926 | Wiley et al. | 425/8 X |
| 2,796,452 | 6/1957 | Krall | 13/10 X |
| 884,571 | 4/1908 | Cowing | 425/8 X |
| 2,217,235 | 10/1940 | Rieser | 425/8 X |
| 2,439,776 | 4/1948 | Klein et al. | 425/8 |
| 3,489,841 | 1/1970 | Cheng | 13/10 X |

*Primary Examiner*—Robert L. Spicer, Jr.
*Attorney*—Townsend & Townsend

[57] ABSTRACT

A method and apparatus for the melting of metallic scrap or other meltable material and the conversion of the molten material into shot or splatter. An arc furnace is provided incorporating a rotatable melt crucible with appropriate drive and cooling systems within an evacuated or controlled atmosphere enclosure. A rotating electrode wheel is positioned above the surface of the crucible in arc-forming proximity to the melt contained therein and a voltage source is applied between the electrode wheel and crucible to produce an arc of sufficient intensity to melt the materials involved. The crucible is rotated during the melting to vary the point of arc impingement on the melt surface. When a sufficient amount of molten material is contained within the crucible the rotational speed of the crucible is increased to cause molten material to leave the crucible at its periphery in the form of droplets which contact the enclosure wall and solidify in the form of shot or splatter. The solid material is collected in a toroidal shaped hopper section at the bottom of the enclosure to be removed through hatch doors.

10 Claims, 2 Drawing Figures

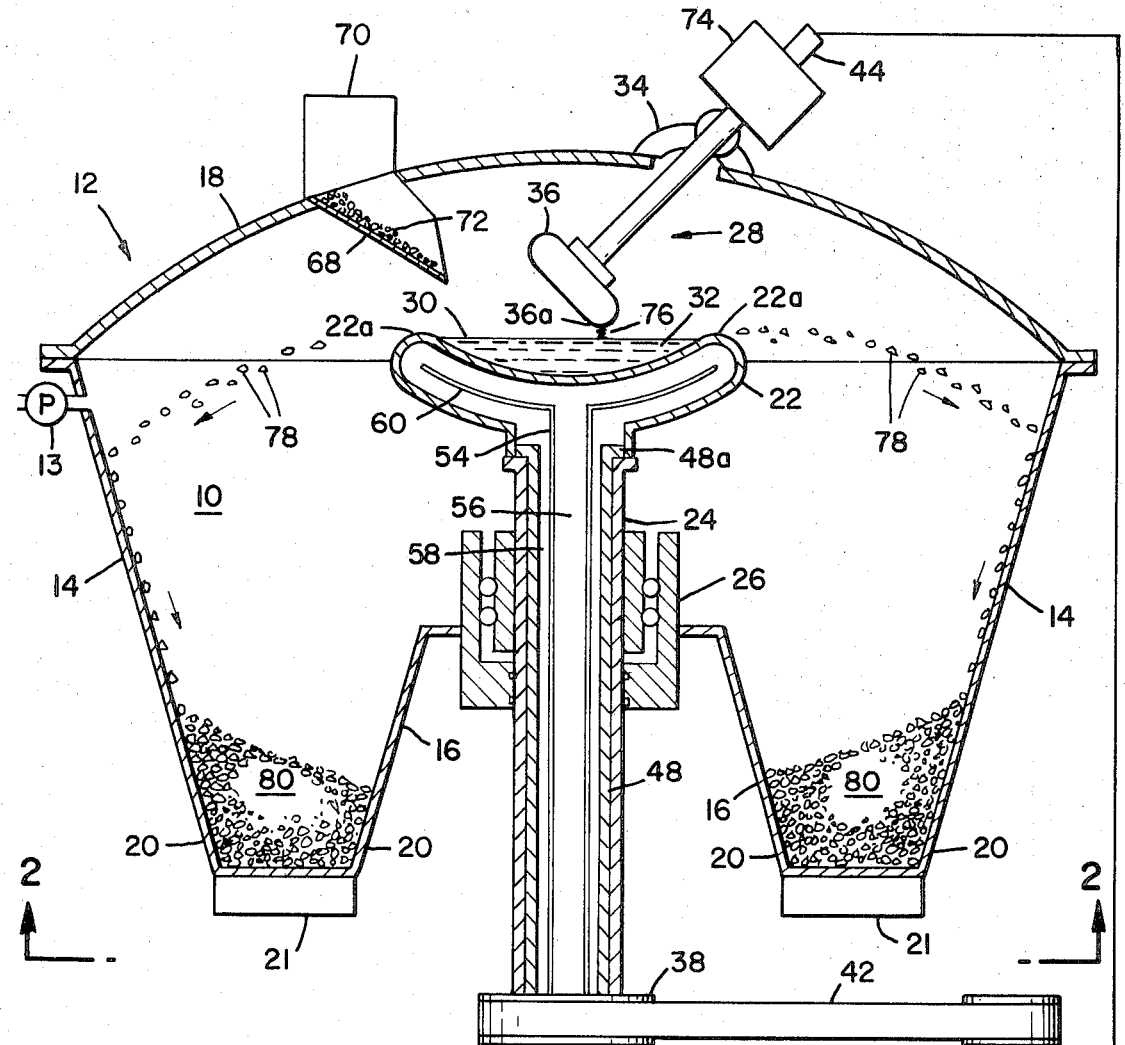
FIG_1
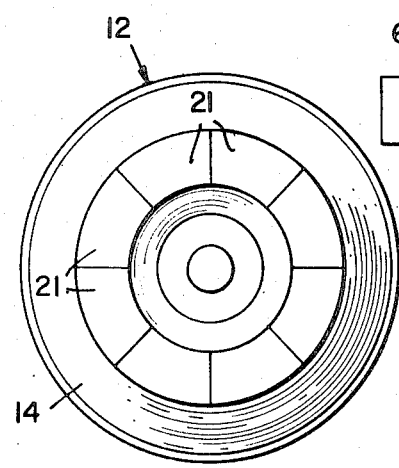
FIG_2
INVENTOR.
MAX P. SCHLIENGER
BY
Townsend and Townsend
ATTORNEYS

ROTATING ARC FURNACE CRUCIBLE

The present invention relates to a method and apparatus for melting metallic scrap or other meltable material and converting the molten material into the form of shot or splatter.

Conventional arc furnaces generally incorporate a melt contained within a crucible and an electrode positioned to establish an arc to the melt in order to create a sufficient temperature gradient to melt materials within an evacuated or controlled atmosphere chamber. In such arc melting furnaces meltable material is intermittently or continuously added to the melt until a sufficient amount of molten material is contained within the crucible. At this point the molten contents of the crucible are removed according to various methods which are well known to those skilled in the art of melting and casting metals. One such method involves tilting the crucible sufficiently to pour the molten material from a spout located on the crucible rim. One difficulty associated with conventional methods relates to the necessity of breaking up the stream of molten metal issuing from the crucible spout into particles of manageable size.

The prior art has also recognized the desirability of accelerating the melting process by stirring, mixing or otherwise circulating the molten contents of the crucible as new material is added.

Accordingly it is a primary object of the present invention to provide a system and method for removing the molten contents of an arc furnace crucible which eliminates the necessity of mechanically breaking up the stream of molten metal which would normally be poured from the crucible spout.

A still further object of the present invention is to provide an arc furnace system wherein the arc does not impinge on the melt surface at the same point for any prolonged period, such object to be accomplished in a simple, easily controlled manner with a minimum of operator intervention or control.

A still further object of the present invention is to provide an arc furnace system in which the excessive skull or splatter which accumulates on the crucible rim may be removed in a simple manner.

These and other objects, features and advantages of the present invention will be more readily apparent from the following detailed description with reference to the accompanying drawings wherein:

FIG. 1 is a pictorial representation of a preferred embodiment of the invention; and FIG. 2 is a sectional view taken along lines 2—2 of FIG. 1.

Referring now to FIG. 1 there is provided an arc furnace contained within an enclosure 10 provided by housing 12 and having an evacuation pump mechanism 13 adapted to withdraw gas from enclosure 10. By this means the enclosure may be maintained under high vacuum conditions the exact pressure of which is determined by the materials to be worked on and the proposed purpose for their treatment. Alternatively, the melting may be accomplished under pressure of suitable inert gases or mixtures. This is sometimes required to prevent evaporation of the materials or alloy while being melted.

Housing 12 is of cylindrical construction having an exterior wall 14 which tapers inwardly toward the central vertical axis of the housing in a downward direction and an interior wall 16 which tapers outwardly from the housing center in a downward direction. These two tapering wall surfaces define a toroidal hopper section 20 at the lower portion of housing 12. This ring-shaped section is provided with a plurality of segmented hatch doors 21 on the lower surface. Housing 12 is provided with a hemispherical or dome shaped roof section 18.

Centrally mounted within the housing interior 10 is crucible 22 fixedly mounted on the upper end of tubular drive shaft 24 which is rotatably mounted within the housing by means of bearing and seal assembly 26. A rotating electrode wheel assembly 28 is pivotally suspended above the surface 30 of melt 32 contained within crucible 22 by means of swivel mounting 34 which is positioned on the upper hemispherical surface 18 of housing 12. One suitable type of pivotal electrode wheel mounting is disclosed in my co-pending Patent Application entitled "Arch Furnace Electrode Wheel Mounting System," Ser. No. 55,869, filed on July 5, 1970. This application describes an electrode wheel mounting system designed to allow the wheel to be positioned adjacent to the melt surface at various points thereon and inclined at varying angles thereto as desired. This application discloses an electrode assembly which is mounted to position an electrode wheel 36 in an obliquely inclined orientation to melt surface 30 such that successive portions of the electrode wheel periphery 36A are brought into arc-forming proximity to the melt surface as the electrode wheel is rotated.

Drive shaft 24 is provided with a drive pulley 38 mounted exterior of enclosure 10. A rotary drive motor 40 is provided to rotate drive shaft 24 and attached crucible 22 through belt 42 contacting drive pulley 38. Alternatively, any other suitable conventional mechanical coupling device can be employed.

A source of high voltage energy potential is applied between electrode terminal 44 which is electrically connected to electrode wheel 36, and crucible terminal 46 which is electrically connected to the conductive melt materials within crucible 22 through conductive liner 48 which is mounted on the interior surface of tubular drive shaft 24 and contacts crucible 22 at interface 48a. This voltage is supplied by power supply 50 one terminal of which is connected to electrode terminal 34 and the other terminal of which is connected to conductive liner 48 through crucible terminal 46 and slip ring assembly 52.

A tubular conduit 54 is centrally disposed within drive shaft 24. The interior of conduit 54 forms coolant intake tube 56 and the annular space between conduit 54 and the interior surface of drive shaft 24 which surrounds it defines coolant exhaust duct 58. Conduit 54 terminates at its upper end in baffle 60 which directs the coolant impinging on the interior upper surface of crucible 22 radially outward along substantially the entire surface of the crucible 22 which is in contact with melt 32 and thereafter into coolant exhaust duct 58. Coolant intake tube 56 is in fluid transmitting communication with coolant supply means 62 through rotary fluid coupling 64. Similarly, fluid exhaust duct 58 is in fluid transmitting communication with coolant exhaust means 66 through fluid coupling 64.

Materials to be melted can be fed into melt 32 by conventional means. One illustration of such is shown in FIG. 1 in which a chute 68 is fed materials through an airlock mechanism 70. Termination of the chute is arranged to drop work material shown at 72 into crucible 22.

In operation work material 72 is dropped into crucible 22 through airlock 70. Pump 13 is actuated to maintain the interior 10 of housing 12 under appropriate vacuum. Motor 74 is energized to rotate electrode wheel 36 at an appropriate speed and electrical energy is applied between electrode terminal 44 and crucible terminal 46 at sufficient intensity to cause arc 76 to be developed from periphery 36A of electrode wheel 36 to the melt surface 30. The arc raises the thermal gradient sufficiently to cause metal particles shown at 72 to form the molten bath or melt 32. Rotation of electrode wheel 36 continually changes the location on the periphery 36A from which arc 76 emanates. Rotary drive motor 40 rotates drive shaft 34 and attached crucible 22 to vary the point of impingement of arc 76 on the melt surface 30. When a sufficient amount of material is in the molten condition the rotational speed of the crucible is rapidly accelerated so as to cause molten material to leave the crucible at its periphery or rim 22A in the form of droplets shown at 78. The size of the droplets is controlled by varying the rotational speed of the crucible and thus the resulting centrifugal force imparted to the melt material. The droplets cool and solidify upon contact with housing 14 which guides the particles into hopper section 20 in the form of shot or splatter 80. The shot or splatter can then be removed through hatch doors 21 positioned at the bottom of hopper 20.

Coolant is introduced from coolant supply means 62 through rotary fluid coupling 64 and passes under suitable pressure through coolant intake tube 56 which directs it against the heat forming surface of crucible 22. Baffle 60 distributes the coolant over the interior upper surface of the crucible 22 in contact with melt 30 and directs it downwardly to coolant exhaust duct 58 through which it passes under gravity flow to coolant removal means 66 through fluid coupling 64.

The apparatus of the present invention also provides a simple and easily controlled means of avoiding the condition where the arc impinges on the melt surface at the same point for prolonged periods with a minimum of operator intervention. The electrode wheel is merely positioned at a convenient radial distance from the central vertical axis of the crucible and the rotational movement of the crucible beneath provides a constantly varying point of arc impingement. This is to be contrasted to conventional practice with a stationary crucible wherein a human operator is necessary to initiate and thereafter control movement of the electrode assembly over the melt surface in order to avoid the situation described.

A further capability of the present invention relates to the elimination of excessive skull or splatter which accumulates on the crucible circumference forming an undesirable lip thereon. One conventional approach to this problem involves positioning the electrode wheel over the crucible rim as for example by means of a mounting system like that disclosed in my co-pending application referred to above. The electrode is then manually moved around the rim circumference whereby the undesirable accumulation is burned off. In contrast, the present invention provides a simpler means for eliminating such accumulation wherein the electrode is merely positioned over the crucible rim and the crucible is allowed to rotate beneath the electrode thereby burning off the undesirable accumulation.

Other uses and advantages of the present invention will be apparent to those skilled in the art of melting metals and those described herein are illustrative only and not intended as limitations on the present invention. Further although one embodiment of this invention has been shown and described it will be apparent that other adaptations and modifications can be made without departing from the true spirit and scope of the invention.

I claim:

1. In an arc melting furnace having an enclosed housing for providing a controlled ambient atmosphere, a crucible disposed within said housing for containing conductive meltable materials to be melted, and a nonconsumable electrode mounted within said enclosure for movement into arc-forming proximity to the upper surface of the contents of said crucible, the improvement comprising;
   a. means mounting said crucible for rotation about a vertical axis within said housing;
   b. means for rotating said crucible at a speed sufficient to cause portions of said meltable material within said crucible to leave the periphery thereof in the form of droplets under the urging of centrifugal force;
   c. means for solidifying and collecting said droplets for removal from said enclosure;
   d. means for cooling said crucible;
   e. means rotatably mounting said electrode above said crucible to position the axis of rotation of said electrode at an oblique angle to the axis of rotation of said crucible, so that the lower surface of said electrode is maintained in a tangential relationship to the surface of said crucible contents, said electrode being formed in the shape of a wheel; and
   f. means for rotating said electrode wheel to vary the area of arc impingement along the periphery of said wheel which is in arc-forming proximity to said meltable materials.

2. Apparatus according to claim 1 wherein said crucible mounting means comprises a tubular vertically extending drive shaft rotatably mounted within said enclosure and supporting said crucible at its upper end.

3. Apparatus according to claim 2 wherein said rotating means comprises a rotary electric motor, a drive pulley on said drive shaft and a drive belt connected between said motor and said pulley.

4. Apparatus according to claim 2 wherein said cooling means comprise a conduit centrally disposed within said drive shaft and wherein the interior of said conduit forms a coolant intake tube and the annular space between said conduit outer surface and said drive shaft inner surface forms a coolant exhaust duct, said conduit terminating at its upper portion in a baffle section formed to distribute coolant flowing upwardly through said coolant intake tube over the interior surface of said crucible and thereafter direct said fluid into said coolant exhaust duct, means for introducing coolant under pressure into said coolant intake tube and outflow means for collecting fluid flowing from said coolant exhaust duct.

5. Apparatus according to claim 1 wherein said means for solidifying and collecting said droplets comprises a torroidal hopper section formed at the lower portion of said enclosure, and a plurality of access doors mounted on the lower surface of said hopper section.

6. An arc-melting furnace comprising:
   a. a controlled atmosphere enclosure;
   b. a crucible disposed within said housing and being formed to contain meltable materials;
   c. means mounting said crucible for rotation about a vertical axis;
   d. means for introducing meltable material into said crucible;
   e. a rotatable non-consumable electrode wheel positioned above said crucible in arc-forming proximity to the contents thereof, with the lower surface of said electrode wheel in tangential relationship to the surface of said meltable material;
   f. means for rotating said electrode at a sufficient rate so that the intensity of heat necessary to melt said meltable material is shared over the surface of said wheel in arc-forming proximity thereto;
   g. means for rotating said crucible at a sufficient speed to cause melted portions of said meltable material contained therein to leave the periphery of said crucible in the form of droplets;
   h. means for solidifying and collecting said droplets; and
   i. means for cooling said crucible.

7. Apparatus according to claim 6 wherein said means mounting said crucible for rotation comprises a vertically extending tubular drive shaft rotatably mounted within said enclosure and supporting said crucible at its upper end.

8. Apparatus according to claim 7 wherein said rotating means comprises a rotary electric motor, a drive pulley on said drive shaft and a drive belt connected between motor and said pulley.

9. Apparatus according to claim 7 wherein said cooling means comprises a conduit centrally disposed within said drive shaft and wherein the interior of said conduit forms a coolant intake tube and the annular space between said conduit outer surface and said drive shaft inner surface forms a coolant exhaust duct, said conduit terminating at its upper portion in a baffle section formed to distribute coolant flowing upwardly through said coolant intake tube over the interior surface of said crucible and thereafter direct said fluid into said coolant exhaust duct, means for introducing coolant under pressure into said coolant intake tube and means for collecting fluid flowing from said coolant exhaust duct.

10. Apparatus according to claim 6 wherein said solidifying and collecting means comprises a torroidal hopper section formed at the lower portion of said enclosure, and a plurality of access doors mounted on the lower surface of said hopper section.

* * * * *